Sept. 21, 1937.  C. A. COMPTON  2,093,549
AUTOMOBILE OIL FILTER
Filed March 25, 1936
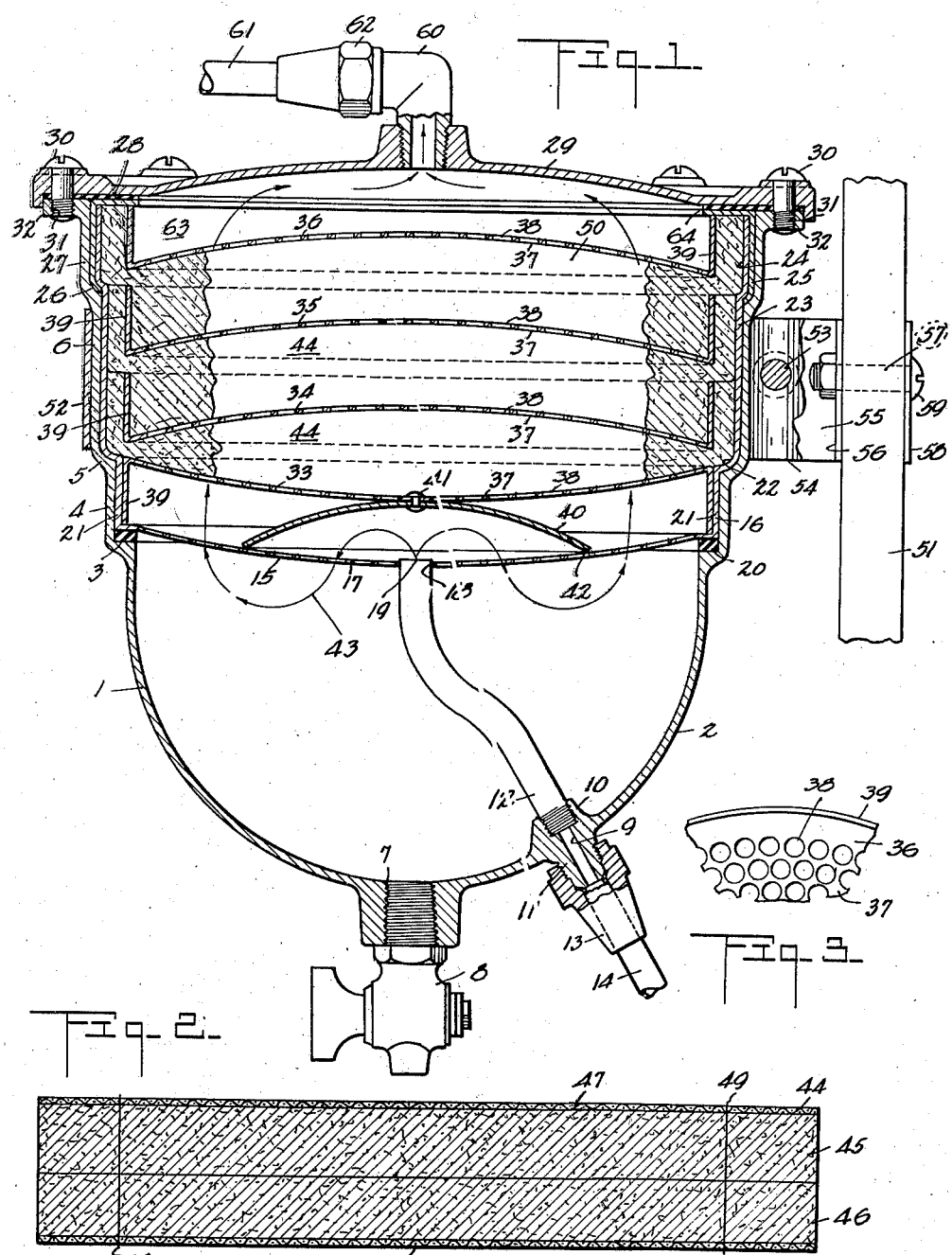
INVENTOR.
CHARLES A. COMPTON.
BY
ATTORNEYS Patented Sept. 21, 1937

2,093,549

UNITED STATES PATENT OFFICE 2,093,549

AUTOMOBILE OIL FILTER

Charles A. Compton, Menlo Park, Calif.

Application March 25, 1936, Serial No. 70,849

9 Claims. (Cl. 210—134)

My invention relates to improvements in automobile oil filters, and it consists of the combinations, constructions and arrangements hereinafter described and claimed.

An object of my invention is to provide an automobile oil filter which is an improvement over the form of the device shown in my Patent No. 2,065,658, issued December 29, 1936. In the copending case I show an oil filter casing provided with a removable cartridge, this cartridge carrying oil filtering means.

In the present invention I make the bottom of the oil filtering casing bowl-shaped and I place an outlet for sediment at the bottom or lowermost portion of the bowl. The inlet pipe for oil enters from a point removed from the sediment outlet, and then the oil inlet pipe is curved so as to extend to the central portion of the casing.

In the present form of the invention I also provide a removable cartridge and this cartridge has a dish-shaped perforated bottom that has a central opening large enough to receive the inlet oil pipe. I further make use of a plurality of screening members all similar to one another, each member being provided with a dish-shaped perforated portion, and a circular flange bounding this portion. The lowermost screening member has its flange facing the bottom of a cartridge and this spaces the perforated portion of the member above the cartridge bottom. An oil deflector is secured to the lowermost screening member and faces in a direction to cause the oil to flow toward the casing bottom immediately after the oil leaves the inlet oil tube. The other screening members face in the opposite direction and are separated from each other by filter pads. The margins of the filter pads are clamped between the flanges of the screening members and the wall of the cartridge casing. The cover is permanently secured to the cartridge casing and holds the screening members and pads in place. A cover for the oil filter casing is removably secured in place and locks the cartridge in position. Gaskets are placed between the top and bottom of the cartridge and the cover of the casing, and a shoulder in the oil filter casing, respectively. An oil outlet pipe leads from the cover.

I further provide novel and simple means for clamping the oil filter to a support, such as the dashboard of an automobile. The device is simple in construction and is durable and efficient for the purpose intended. After the device has been used for filtering oil for a given length of time, the cartridge may be removed and a new one substituted therefor. In this simple way a new oil filtering means can be substituted for the used one.

Other objects and advantages will appear in the following specification, and the novel features of the device will be particularly pointed out in the appended claims.

My invention is illustrated in the accompanying drawing forming a part of this application, in which Figure 1 is a vertical section through the device;

Figure 2 is a sectional view through one of the oil pads; and

Figure 3 is a plan view of a portion of one of the screening members.

In carrying out my invention I provide an oil filter casing indicated generally at 1. This casing has a bowl-shaped bottom 2, a shoulder 3, a cylindrical portion 4, a rounded shoulder 5, and a cylindrical portion 6 larger in diameter than the portion 4. At the bottom of the bowl-shaped portion 2, I provide an outlet opening at 7 for sediment, and a drain cock 8 is threaded into the opening and normally is kept closed. The bowl-shaped portion 2 also has an opening 9 formed therein and bosses 10 and 11 formed integral with the bowl 2 project beyond both sides of the bowl wall and the opening 9 extends through these bosses. The boss 10 is internally threaded and carries an oil inlet tube 12, while the boss 11 is externally threaded and carries a coupling 13 that is used for connecting an oil tube 14 with the boss so that oil will flow from the tube 14 into the bore 9.

Within the casing 1, I removably dispose a cartridge indicated generally at 15. This cartridge has a casing 16 provided with a dish-shaped and perforated bottom 17. The bottom 17 also has an opening 18 just large enough to receive the end 19 of the oil inlet tube 12. The bottom of the cartridge rests on a gasket 20 which in turn is supported by the shoulder 3. The cylindrical wall of the cartridge casing 16 is shaped so as to snugly conform with the portions 4, 5 and 6 of the casing 1. It will be noted from Figure 1 that the portion 21 of the casing 16 parallels the portion 4 of the casing 1. In like manner the portion 22 of the casing 16 conforms to the portion 5 of the casing 1 and the portion 23 conforms to the portion 6. The upper end of the cartridge wall 16 is enlarged again at 24. A cover 25 is disposed on the cartridge and has its flanged edge crimped at 26 for permanently securing the cover to the cartridge. The wall 27 of the casing is enlarged slightly to accommodate the enlarged portion 24 of the cartridge wall and the cover 25.

A gasket 28 is disposed between the cartridge cover 25 and a casing cover 29. The casing cover 29 is removably secured to the casing 1 by screws 30 that are passed through openings in the cover 29, and are threaded into threaded openings 31 in a flange 32 integral with the casing 1. The height of the cartridge is such that when the screws 30 are tightened in place, the cartridge will be clamped between the gaskets 20 and 28, and this will prevent oil from leaking around the outer side of the cartridge.

Within the cartridge I dispose oil filtering means, and this means consists of screening members and filtering pads. In Figure 1, I show four screening members 33, 34, 35 and 36 inclusive. All of these are of similar construction and each has a dish-shaped portion 37 perforated at 38, and the dish-shaped portion is surrounded by a circular flange 39. In Figure 3, I show a plan view of a portion of the screening member 36, for example. It will be seen from this figure that the dish-shaped portion 37 is provided with perforations 38 that are staggered in the manner shown and are spaced a slight distance from a flange 39. The flange 39 bounds the portion 37.

The lowermost screening member 33 is disposed in the cartridge so that its flange 39 faces the bottom 17 of the cartridge casing. This flange 39 contacts with the portion 21 of the cartridge and spaces the portion 37 of the screening member 33 above the perforated bottom 17. A deflector 40 for oil is permanently secured to the member 33 by means of a rivet 41, or other suitable fastening means. This oil deflector faces downwardly and its rim 42 contacts with the cartridge bottom 17. It will be seen from this construction that as oil issues from the tube 12 it will be deflected downwardly by the member 40 as indicated by the arrows 43.

The flanges 39 on the other three screening members 34, 35 and 36 face toward the top of the cartridge. Since the screening members 34, 35 and 36 are identical to the member 33 it will be seen that the flanges 39 of the last three screening members are spaced from the wall of the cartridge.

I dispose filtering pads indicated generally at 44, see Figure 2, between adjacent screening members. The two lowermost pads each comprise two layers of cotton batting 45 and 46 or other suitable filtering material, and these two layers are placed one above the other, and their outer surfaces are covered by circular pieces of cloth 47 and 48. Stitching 49 may be used for securing the two layers of cloth and layers of cotton batting together. The diameter of the filtering member 44 is larger than the diameter of the portion 37 of the screening members. This will cause the marginal edge of the pad to extend beyond the flange 39. The thickness of the pad 44, when not compressed, is considerably greater than the space between the flanges 39 of the members 33 and 34. This construction causes the pad 44 to completely fill the middle portion of the space between the members 33 and 34 even though this portion is considerably greater than the space between the marginal edges of the same members. The portion of the pad projecting beyond the marginal edges is clamped between the flange 39 of the member 34 and the wall portion 23 of the cartridge.

In like manner a second pad 44 is disposed between the screening members 34 and 35, and this pad will fill the space between the members and will have its marginal edge clamped between the flange 39 and the member 35, and the wall portion 23 of the cartridge. The top filtering pad is provided with an additional layer of cotton batting so that its thickness will be substantially one-third greater than the other two pads 44. The top pad 50 in all other respects is identical to the pad 44. The pad 50 is compressed between the members 35 and 36 and the edge of the pad is clamped between the flange 39 of the member 36 and the wall portion 24 of the cartridge. After all of the screening members and filter pads have been disposed in place in the manner just indicated, the cartridge cover 25 is secured in place by crimping as shown at 26. The cartridge as a unit may now be disposed in the oil filter casing 1 and may be locked in place by the casing cover 29 in the manner already set forth.

The casing 1 may be secured to a supporting member such as a dashboard 51 of an automobile, and I provide a circular U clamp band 52 for surrounding the casing. A bolt 53 moves the legs 54 and 55 of the clamp toward each other for gripping the casing 1, and then the outwardly turned ends 56 of the legs are secured to the support 51 by bolts 57, or other suitable fastening means. A washer strip 58 may be disclosed between the bolt heads 59 and the support 51.

From the foregoing description of the various parts of the device the operation thereof may be readily understood.

The cover 29 carries an oil outlet elbow 60, and this elbow is connected to an oil return pipe 61 by means of a coupling 62. This return pipe 61 leads to the crank case of an automobile engine not shown. The inlet oil tube 14 also leads from the crank case and an oil pump not shown is used for forcing the oil through the filter.

The oil passes through the pipe 12, and then is deflected by the deflector 40 down toward the bowl-shaped bottom 2 of the casing. The oil is initially screened in passing through the perforated bottom 17. The oil then is caused to flow upwardly as shown by the arrows and again passes through the perforated bottom 17 of the cartridge. The sudden reversing of the oil flow causes it to give up foreign particles held in suspension. A third filtering of the oil takes place when it passes upwardly through the perforated bottom 17. From this point the oil passes successively through the screening members 33 to 36 inclusive and the filtering pads disposed between these members. The top member 36 spaces the top pad 50 from the cartridge cover 25 and therefore a reservoir 63 for clean oil is provided. The cartridge cover 25 has a large opening 64 and the oil therefore will find its way through the opening and out through the elbow 60, and then to the return oil pipe 61 that conveys the oil back to the crank case. The construction of the pads and screening members 34 to 36 inclusive is such as to prevent the oil from passing around the outside of the flanges 39. The unperforated rim portions of the screens 34, 35 and 36 tend to direct the oil inwardly. Sufficient filtering material is afforded in the pads to clean the oil before it reaches the top reservoir 63. The filtering of the oil is continuous so long as the engine operates and the oil is delivered to the device.

As soon as the engine stops the oil in the reservoir 63 will gravitate down to the point where the oil level is flush with the inlet end of the pipe 12. This backward flow of oil has a tendency to clean the pads of foreign matter and to deposit this foreign matter in the bowl-shaped portion 2.

It should also be noted that the purpose of initially directing the oil flow downwardly from the deflector 40 and then reversing this flow to cause the oil to flow upwardly is to separate foreign particles from the oil. These particles will continue to move downwardly to the bottom of the bowl 2 where they will remain until the bowl is drained of sediment by opening the drain cock 8.

From time to time the drain cock 8 may be opened to allow the sediment trapped in the bowl-shaped portion 2 to escape. After the cartridge has been used for a given length of time it may be renewed by first removing the cover 29 and then lifting the cartridge from the casing 1. A new cartridge may be substituted for the used one, and then the cover 29 secured in place. The device is now like new and can effectively clean the oil for another given time period.

While I have shown only the preferred form of my invention, it should be understood that various changes or modifications may be made within the scope of the appended claims without departing from the spirit of the invention.

I claim:

1. In an automobile oil filter, a casing with a shoulder therein and a top, a screening member supported by the shoulder, a second screening member disposed above the first member and carrying an integral flange designed to rest on the first member for spacing the second member above the first member, an oil inlet conduit extending through the casing wall and having its inner end projecting a slight distance through the first mentioned screening member for directing the oil upwardly, a deflector disposed adjacent to the inner end of the conduit for directing the oil downwardly, said deflector being positioned between the two screening members, filtering material disposed between the second screening member and the casing top, and an oil outlet leading from the top.

2. In an oil filter cartridge comprising a cylindrical casing with a lower portion of a reduced diameter and a perforated bottom, said casing having a shoulder connecting the reduced portion with the remainder of the casing, a screening member disposed in the casing bottom and provided with an integral flange of the same length as the length of the reduced portion, whereby the screening member forms a continuation of the shoulder, and a second screening member similar to the first and placed in the casing with its flange extending in a direction opposite to the flange of the first member, and a filtering pad disposed between the screening members and having its marginal edge extending over the shoulder and clamped between the flange of the second member and the casing wall.

3. In an oil filter cartridge comprising a cylindrical casing with a lower portion of a reduced diameter and a perforated bottom, said casing having a shoulder connecting the reduced portion with the remainder of the casing, a screening member disposed in the casing bottom and provided with an integral flange of the same length as the length of the reduced portion, whereby the screening member forms a continuation of the shoulder, and a second screening member similar to the first and placed in the casing with its flange extending in a direction opposite to the flange of the first member, and a filtering pad disposed between the screening members and having its marginal edge extending over the shoulder and clamped between the flange of the second member and the casing wall, additional similar screening members placed on top of the second named member, and filtering pads placed between adjacent members and having their edges clamped between the flanges of the members and the casing wall.

4. In an oil filter cartridge comprising a cylindrical casing with a lower portion of a reduced diameter and a perforated bottom, said casing having a shoulder connecting the reduced portion with the remainder of the casing, a screening member disposed in the casing bottom and provided with an integral flange of the same length as the length of the reduced portion, whereby the screening member forms a continuation of the shoulder, and a second screening member similar to the first and placed in the casing with its flange extending in a direction opposite to the flange of the first member, and a filtering pad disposed between the screening members and having its marginal edge extending over the shoulder and clamped between the flange of the second member and the casing wall, additional similar screening members placed on top of the second named member, and filtering pads placed between adjacent members and having their edges clamped between the flanges of the members and the casing wall, a cover for the cartridge casing, the flange of the top screening member bearing against the cover for forming an oil reservoir.

5. A cartridge for an oil filter having a dish-shaped and perforated bottom, with a central opening larger than the perforations, and an oil deflector disposed within the cartridge and being spaced from the large central opening, the rim of the deflector contacting with the bottom.

6. A cartridge for an oil filter having a dish-shaped and perforated bottom, with a central opening larger than the perforations, and an oil deflector disposed within the cartridge and being spaced from the large central opening, oil filtering means disposed in the cartridge and including screening members and filtering pads, one of said members carrying the oil deflector, the rim of the deflector contacting with the bottom.

7. A cartridge for an oil filter having a dish-shaped and perforated bottom, with a central opening larger than the perforations, and an oil deflector disposed within the cartridge and being spaced from the large central opening, the rim of the deflector contacting with the bottom, oil filtering means disposed in the cartridge and including screening members and filtering pads, one of said members carrying the oil deflector, and a cover for the cartridge and bearing against the uppermost screening member and pad, said cover being permanently secured to the cartridge.

8. A removable cartridge for an oil filter and comprising a casing, a plurality of similar screening members each including a dish-shaped perforated portion bounded by a circular flange, the flange of the lowermost screening member facing toward the casing bottom while all of the other members are inverted, and filtering pads disposed between adjacent members, the bottom of the casing being perforated, the dish-shaped portion of the lowermost member being spaced from the casing bottom by the flange, and an oil deflector carried by the lowermost member.

9. In an oil filter, a casing, means for directing oil upwardly through the casing, a plurality of screening members provided with dish-shaped bottoms bounded by circular flanges, the concave faces of the bottoms facing the bottom of the casing, filtering pads placed between adjacent screens, the edges of the pads being clamped to the casing wall by the flanges, said screening bottoms being perforated, the perforations starting a short distance from the flanges, whereby the unperforated bottom portions constitute oil directing means for guiding the oil toward the interior of the filter.

CHARLES A. COMPTON.